United States Patent
Olarig et al.

(10) Patent No.: US 10,496,566 B2
(45) Date of Patent: Dec. 3, 2019

(54) METHOD AND APPARATUS FOR DATA RECOVERING DURING A BOARD REPLACEMENT

(71) Applicant: Samsung Electronics Co., Ltd., Suwon-si, Gyeonggi-do (KR)

(72) Inventors: Sompong Paul Olarig, Pleasanton, CA (US); Son T. Pham, San Ramon, CA (US); Ramdas P. Kachare, Cupertino, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 45 days.

(21) Appl. No.: 15/447,086

(22) Filed: Mar. 1, 2017

(65) Prior Publication Data

US 2018/0173652 A1  Jun. 21, 2018

Related U.S. Application Data

(60) Provisional application No. 62/437,029, filed on Dec. 20, 2016.

(51) Int. Cl.

| | |
|---|---|
| *G06F 13/16* | (2006.01) |
| *G06F 11/16* | (2006.01) |
| *G06F 13/42* | (2006.01) |
| *G06F 13/40* | (2006.01) |
| *G06F 11/14* | (2006.01) |

(52) U.S. Cl.
CPC ...... *G06F 13/1668* (2013.01); *G06F 11/1469* (2013.01); *G06F 11/1616* (2013.01); *G06F 13/4027* (2013.01); *G06F 13/4282* (2013.01); *G06F 2201/84* (2013.01); *G06F 2213/0026* (2013.01)

(58) Field of Classification Search
CPC ......... G06F 3/0604; G06F 13/24; G06F 13/36
See application file for complete search history.

(56) References Cited

U.S. PATENT DOCUMENTS

| | | | |
|---|---|---|---|
| 8,948,000 B2 | 2/2015 | Armstrong et al. | |
| 9,280,504 B2 | 3/2016 | Ben-Michael et al. | |
| 2004/0165890 A1* | 8/2004 | Tomich | H04Q 11/0067 398/79 |
| 2008/0046628 A1* | 2/2008 | Hunsaker | G06F 13/423 710/315 |
| 2013/0201316 A1* | 8/2013 | Binder | H04L 67/12 348/77 |
| 2014/0344492 A1* | 11/2014 | Patwa | G06F 13/24 710/269 |
| 2015/0186319 A1 | 7/2015 | Blevins et al. | |

(Continued)

*Primary Examiner* — Getente A Yimer
(74) *Attorney, Agent, or Firm* — Renaissance IP Law Group LLP

(57) ABSTRACT

A management controller is disclosed. The management controller may include a receiver to receive a request from an initiator. A translator may translate the request received from the initiator into a command for a multi-mode single port device. A bridge may communicate with the multi-mode single port device and the initiator, sending the command to the multi-mode single port device and receiving a reply from the multi-mode single port device. The translator may then translate the reply to the command into a response for the initiator, whereupon a transmitter may transmit the response to the initiator.

19 Claims, 10 Drawing Sheets

(56) References Cited

U.S. PATENT DOCUMENTS

| | | | | |
|---|---|---|---|---|
| 2016/0062936 A1 | 3/2016 | Brassac et al. | | |
| 2016/0147452 A1* | 5/2016 | Bae | ............... | G11C 29/023 |
| | | | | 711/103 |
| 2016/0202914 A1* | 7/2016 | Hsu | ............... | G06F 3/0604 |
| | | | | 714/49 |
| 2016/0378359 A1* | 12/2016 | Jang | ............... | G06F 3/0613 |
| | | | | 711/118 |

* cited by examiner

METHOD AND APPARATUS FOR DATA RECOVERING DURING A BOARD REPLACEMENT

RELATED APPLICATION DATA

This application claims the benefit of U.S. Provisional Patent Application Ser. No. 62/437,029, filed Dec. 20, 2016, which is incorporated by reference herein for all purposes.

FIELD

The inventive concepts relate generally to computer devices, and more particularly to computer devices that may support single port Input/Output (I/O) while in a high availability chassis.

BACKGROUND

Most widely used Solid State Drives (SSDs) support single port Input/Output (I/O). Some SSDs support dual port I/O for higher system availability by offering better fault protection. But dual port devices are generally more expensive and may have slightly lower performance (if the amount of information to be sent exceeds the capacity of the bus used to transfer the information). Ethernet attached SSDs or Non-Volatile Memory Express (NVMe) Over Fabrics (NVMeoF) devices are considered new, emerging, and disruptive technology. Such devices may have different types, but would fall under either single port or dual port I/O devices.

But while single port I/O devices are less expensive and may offer better performance, single port I/O devices do have a weakness: the chassis only uses one path to communicate with the device. If any component along this path should fail, the device (and more importantly, any data on the device) will be inaccessible until the fault is corrected or the system performs a graceful recovery.

A need remains for a way for to provide access to single port devices in the event of a failure along the path between the device and its chassis.

DETAILED DESCRIPTION

Figure 1:
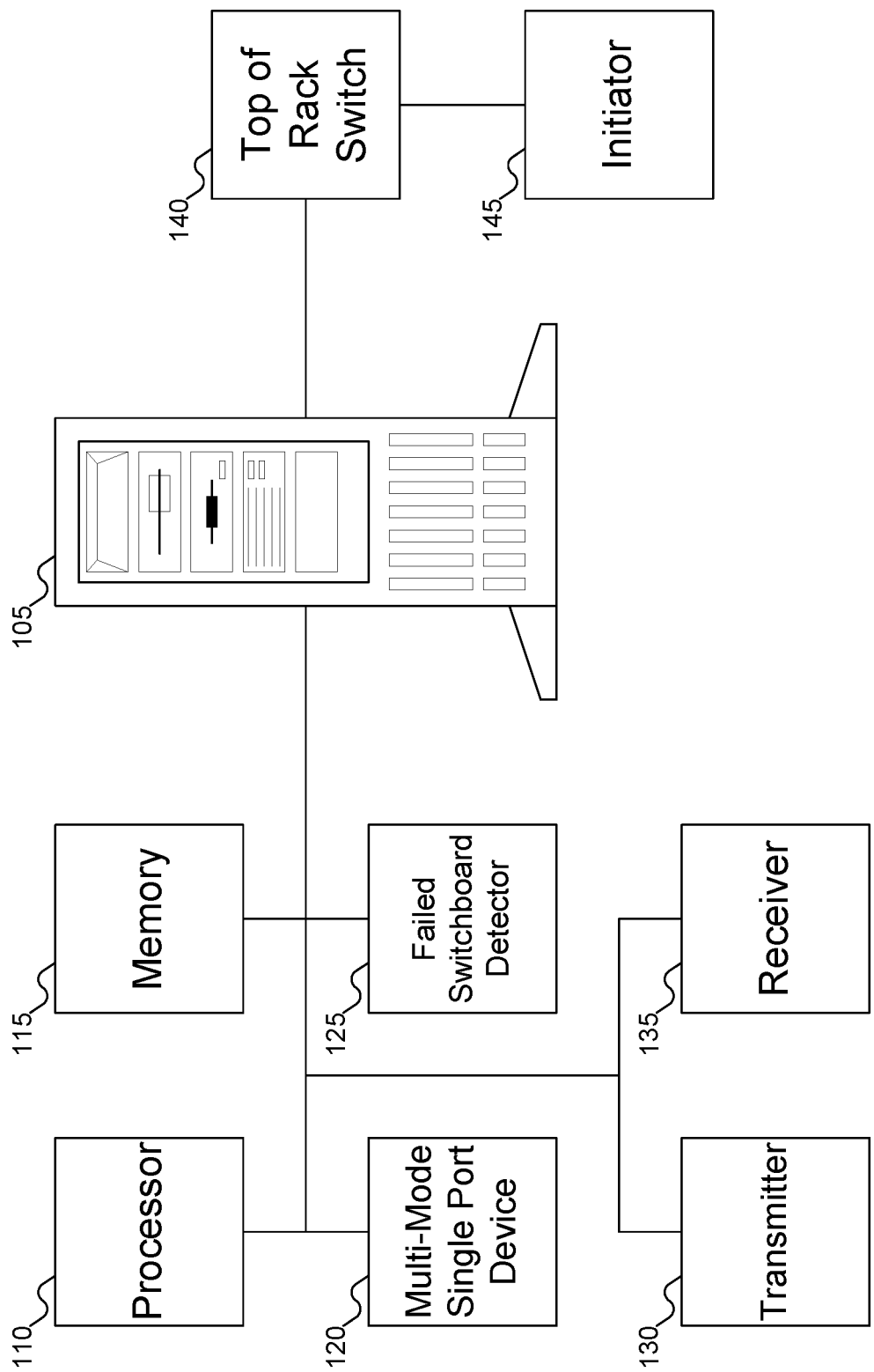
FIG. 1 shows a machine with a device, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Imagine a hypothetical architecture supporting two half-width hot-pluggable switchboards. When a replacement of a switchboard is required, single port devices that are connected to the failed switchboard will not survive the disruption due to the lack of an alternate or redundant data path to the affected devices. During this time, data on these devices are no longer available. This will cause undesirable consequences.

An alternative means of communication via the control plane may be used as a temporary data path during a failure in communicating with for single port Input/Output (I/O) devices. During normal operations, this alternative communication means via the control plane is not active as a data path, but may be active in and use by a Baseboard Management Controller (BMC) for monitoring target devices. During failure or board replacement, the alternative communication means will become active and may be used to move data to/from the affected devices to the requesting initiator(s). Note that the failure might not be of the primary switchboard in its entirety: it might be that the primary switchboard is subject to a hardware upgrade to some component, or that an individual component (that may be replaced) has failed. It might also be that a component that has not failed is nevertheless being hot-swapped (for example, to upgrade that component).

Before physically removing the failed switchboard, a latch sensor may detect that the failed switchboard is about to be physically removed from the system chassis. The local central processing unit (CPU) and/or BMC may be notified by the opening latch-induced interrupt and immediately notify all initiators connecting to the affected devices. All the affected initiators may contact the BMC peer on the surviving switchboard (the other half of the same chassis) via the Top of the Rack (TOR) Switch to establish a temporary communication means during this downtime event. The replacement of the failed switchboard is expected to be on the order of minutes.

As an example, consider an Ethernet Solid State Drive (SSD), or eSSD, chassis consisting of two switchboards. Each switchboard has an Ethernet switch controller with up-link ports that connect to remote initiators. The Ethernet switch controller provides download ports that connect directly to the eSSDs through a common midplane. The Ethernet paths to the devices are considered the data path or data-plane.

But there is another path used for controlling and monitoring the health of the system, called the control path or control plane. The control plane consists of a local CPU, memory, BMC and Peripheral Component Interconnect Express (PCIe) switch. The BMC chip connects to all the eSSDs using the PCIe bus through the on-board PCIe switch.

During replacement of the primary switchboard, the initiators may be notified that the primary switchboard is no longer available. The initiators may reroute the same requests to the secondary switchboard's BMC. The currently active BMC on the secondary switchboard may forward the requests directly through its local PCIe switch to the appropriate target or eSSD. The data will be transferred to/from eSSD using the PCI-e X2 lane.

BMC software may operate as a bridge device. When it receives Non-Volatile Memory Express (NVMe) Over Fabrics (NVMeoF) commands from the host driver, the BMC may use the PCIe bus to get the required data from eSSD. There are multiple ways for a BMC to read data from the eSSD. The BMC may use industry standards, such as NVMe Management Interface over either the PCIe bus or the System Management Bus (SMBus). The BMC may also use a normal NVMe interface over PCIe.

After the primary switchboard has been replaced successfully, traffic may flow back through the normal path.

FIG. 1 shows a machine with a device, according to an embodiment of the inventive concept. In FIG. 1, chassis 105 is shown. Chassis 105 may be any desired chassis, including without limitation a desktop or laptop computer, a server (either a standalone server or a rack server), or any other device that may benefit from embodiments of the inventive concept. Chassis 105 may also include specialized portable computing devices, tablet computers, smartphones, and other computing devices.

Chassis 105, regardless of its specific form, may include processor 110, memory 115, multi-mode single port device 120 (referred to just as "device", for short), failed switchboard detector 125, transmitter 130, and receiver 135. Processor 110 may be any variety of processor: for example, an Intel Xeon, Celeron, Itanium, or Atom processor, an AMD Opteron processor, an ARM processor, etc. While FIG. 1 shows a single processor, chassis 105 may include any number of processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically DRAM. Memory 115 may also be any desired combination of different memory types.

Failed switchboard detector 125 may determine whether the primary switchboard, to which device 120 may be connected, is operative. That is, failed switchboard detector 125 may determine whether the primary communication path used to communicate with device 120 is operational or not.

Device 120 may be any variety of device. While the described embodiments of the inventive concept refer to storage devices such as Ethernet Solid State Drives (eSSDs), embodiments of the inventive concept may be applied to any form of device that may benefit from the separation of the data and control planes (for example, multi-mode Serial Attached Small Computer System Interface (SCSI) (SAS) devices), or to devices that use communication protocols other than Ethernet (for example, InfiniB and or Fibre Channel). As used herein, the term "device" is intended to encompass any multi-mode device, regardless of the form factor, interfaces, or protocols (such as Ethernet, InfiniB and, Fibre Channel, Non-Volatile Memory Express (NVMe), or NVMe Over Fabrics (NVMeoF)) used by the device. Examples of such devices may include Solid State Drives (SSDs) and more particularly eSSDs, but other storage forms, such as hard disk drives or other long-term storage devices, are also viable, as may be devices other than storage devices. The described use of an SSD device is merely a simplification for descriptive purposes.

Transmitter 130 and receiver 135 permit communication to and from chassis 105. Transmitter 130 may transmit information from chassis 105, and receiver 135 may receive information at chassis 105.

One component with which chassis 105 might communicate is Top of Rack (TOR) switch 140. TOR switch 140 permits communications to be directed to a particular device within the rack. For example, while FIG. 1 shows chassis 105 including all of the devices therein (aside from TOR switch 140), processor 110 might desire to communicate with device 120 in a different chassis. Thus, embodiments of the inventive concept may include only some of the components shown in FIG. 1.

Other devices may also use TOR 140 to communicate with device 120. For example, initiator 145, which may be another processor (or an operating system or an application running on such a processor) in another chassis may send requests to device 120. While FIG. 1 shows initiator 145 as separate from chassis 105 and the components therein, it is possible for processor 110 to initiate a request sent to device 120. For example, when using chassis 105 is an NVMe chassis, initiator 145 is typically located within chassis 105; but when chassis 105 is an NVMeoF chassis, initiator 145 is expected to be external to chassis 105. The term "initiator" is intended to encompass all such concepts, from which a particular request may originate.

Figure 2:
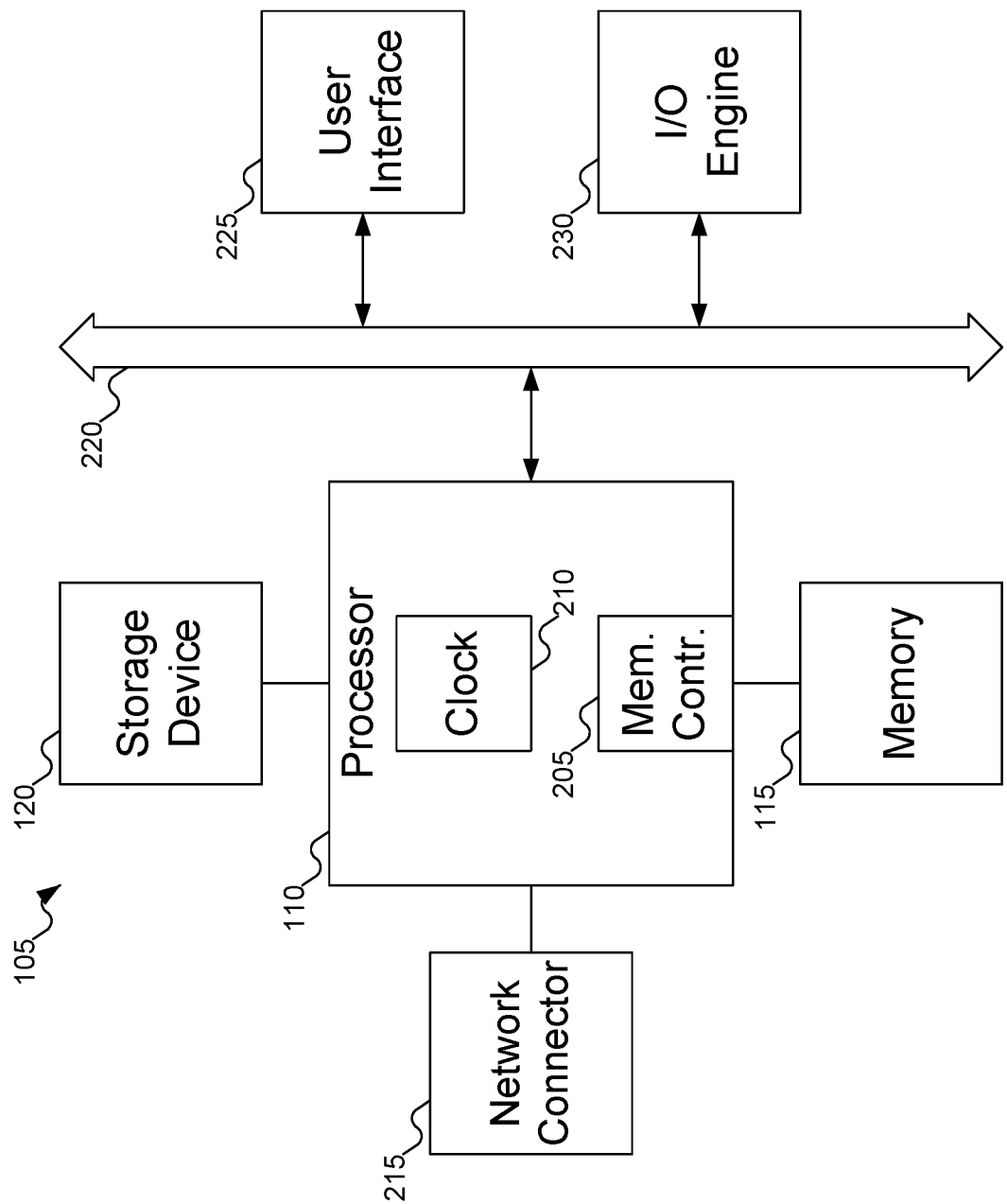
FIG. 2 shows additional details of the machine of FIG. 1.

FIG. 2 shows additional details of the chassis of FIG. 1. Referring to FIG. 2, typically, chassis 105 includes one or more processors 110, which may include memory controller 205 and clock 210, which may be used to coordinate the operations of the components of chassis 105. Processors 110 may also be coupled to memory 115, which may include random access memory (RAM), read-only memory (ROM), or other state preserving media, as examples. Processors 110 may also be coupled to devices 120, and to network connector 215, which may be, for example, an Ethernet connector or a wireless connector. Processors 110 may also be connected to a bus 220, to which may be attached user interface 225 and Input/Output interface ports that may be managed using Input/Output engine 230, among other components.

Figure 3A:
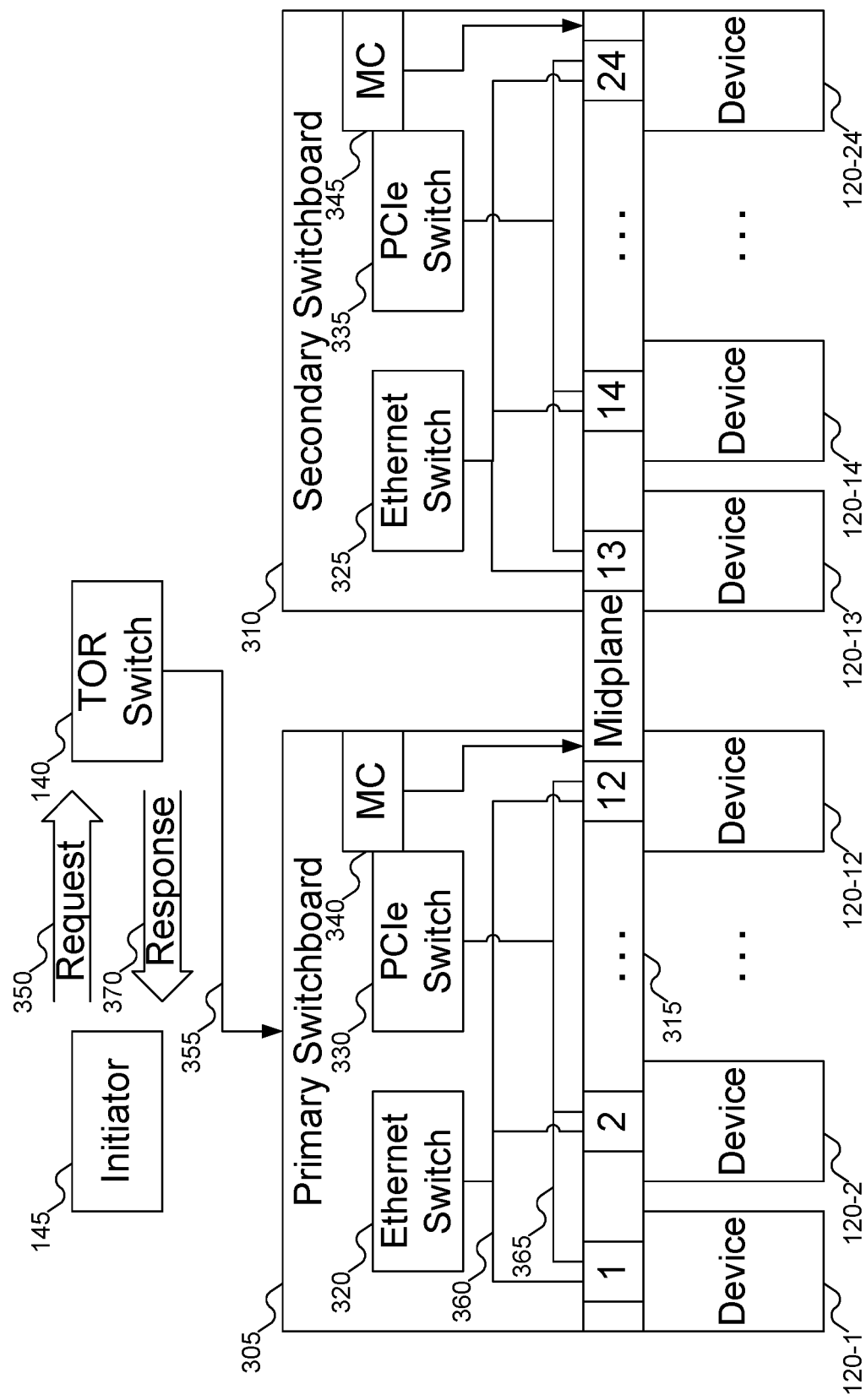
FIG. 3A shows the chassis and device of FIG. 1 communicating using a first communication path.

FIG. 3A shows chassis 105 and device 120 of FIG. 1 communicating using a first communication path. In FIG. 3A, chassis 105 of FIG. 1 may include up to 24 devices, managed by switchboards 305 and 310 via midplane 315. In the example embodiment of the inventive concept shown in FIG. 3A, devices 120 may communicate with initiator 145 using Ethernet as a data plane and PCIe as a control plane, but other embodiments of the inventive concept may support other communication modes for either the data plane or the control plane. For more information about multi-mode devices, U.S. patent application Ser. No. 15/411,962, filed Jan. 20, 2017, which claims the benefit of U.S. Provisional Patent Application Ser. No. 62/426,422, filed Nov. 25, 2016; U.S. patent application Ser. No. 15/256,495, filed Sep. 2, 2016, which claims the benefit of U.S. Provisional Patent Application Ser. No. 62/366,622, filed Jul. 26, 2016; U.S. patent application Ser. No. 15/345,507, filed Nov. 7, 2016, which claims the benefit of U.S. Provisional Patent Application Ser. No. 62/394,726, filed Sep. 14, 2016; U.S. patent application Ser. No. 15/345,509, filed Nov. 7, 2016, which claims the benefit of U.S. Provisional Patent Application Ser. No. 62/394,727, filed Sep. 14, 2016; and U.S. patent application Ser. No. 15/403,008, filed Jan. 10, 2017, which claims the benefit of U.S. Provisional Patent Application Ser. No. 62/420,355, filed Nov. 10, 2016, all of which are incorporated by reference herein, may be examined.

Each switchboard 305 and 310 may include Ethernet switch 320 and 325, PCI switch 330 and 335, and management controller 340 and 345. As described above, Ethernet switches 320 and 325 and PCI switches 330 and 335 may be used to manage communication with devices 120; management controllers 340 and 345 may monitor the operation of components within chassis 105 of FIG. 1. To enable embodiments of the inventive concept, management controllers 340 345 may talk with any of devices in chassis 105 of FIG. 1. In FIG. 3A, 24 such devices are shown, identified as devices 120-1 through 120-24, but embodiments of the inventive concept may support greater or fewer devices in chassis 105 of FIG. 1. For example, management controllers 340 and 345 may be Baseboard Management Controllers, which (aside from its normal function of monitoring the temperature of the components in chassis 105 of FIG. 1 and adjusting cooling operations accordingly) may communicate with every pertinent component within chassis 105 of FIG. 1.

In FIG. 3A, initiator 145 is shown sending request 350, which may request data from one of the devices managed by primary switchboard 305: for example, device 120-1. Initiator 145 may direct request 350 to TOR switch 140; TOR switch 140 may include information that indicates that request 350 should be sent to primary switchboard 305 via path 355. Based on request 350, primary switchboard 305 may use Ethernet switch 320, PCI switch 330, or both to route commands to device 120-1. For example, data commands may be routed via connection 360 (the data plane), and control commands may be routed via connection 365 (the control plane). Device 120-1 may then return a reply via the same connections, which may be received by initiator 145 as response 370.

Figure 3B:
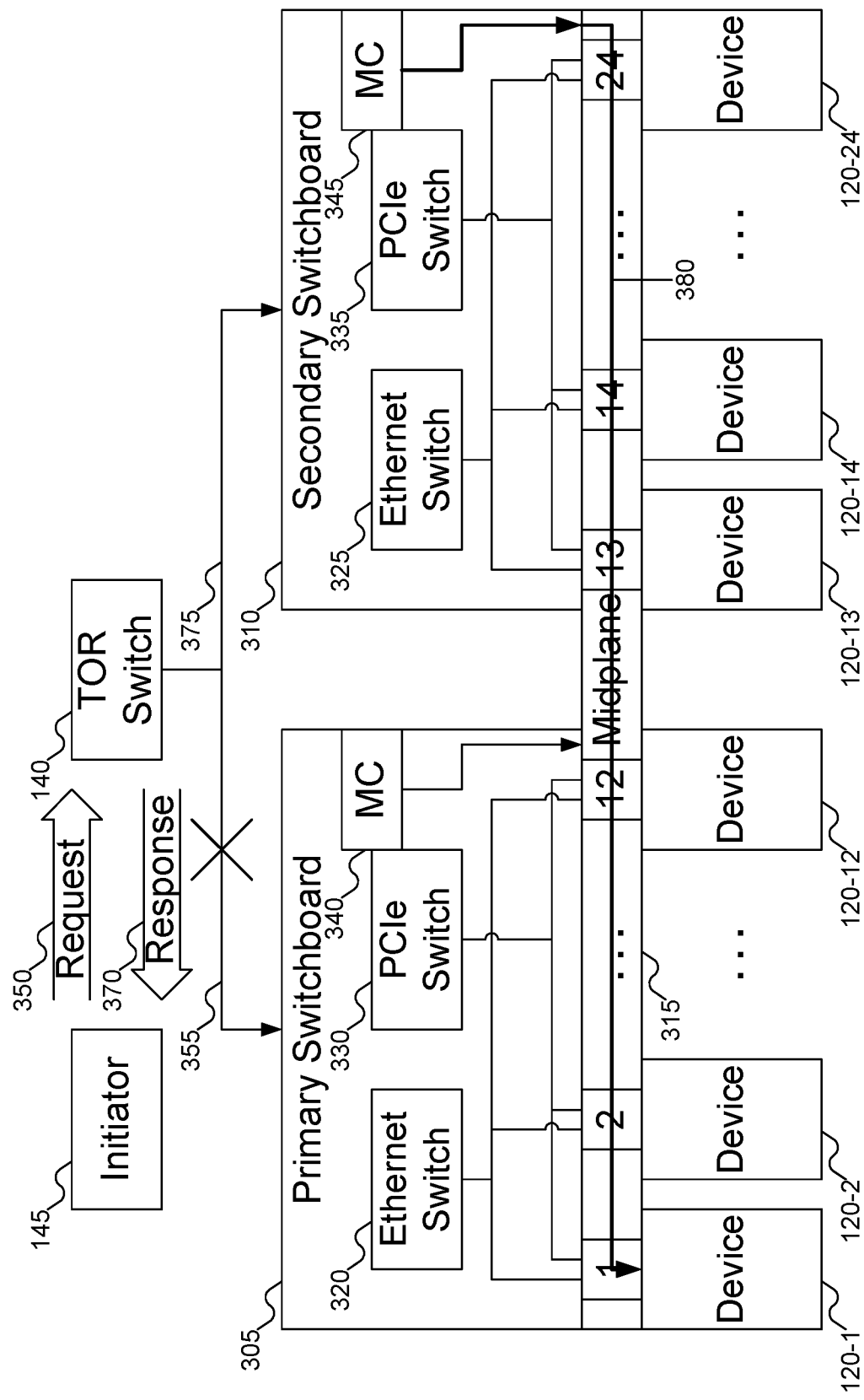
FIG. 3B shows the chassis and device of FIG. 1 communicating using a second communication path in the event the first communication path fails.

When primary switchboard 305 is operating normally, the operation shown in FIG. 3A is fine. But when primary switchboard 305 is not operating normally—for example, if primary switchboard 305 has failed, or if one or more components on primary switchboard 305 is broken—initiator 145 might not be able to send request 350 to device 120-1 via primary switchboard 305. In that case, the data on device 120-1 would be unavailable—unless request 350 were routed differently. As management controllers 340 and 345 share a "heartbeat" communication, management controller 345 may become aware of the problem with primary switchboard 305 when the "heartbeat" with management controller 340 is lost. In this situation, management controller 345 may notify initiator 145 that primary switchboard 305 is not operating normally, and that initiator 145 should failover to secondary switchboard 310. FIG. 3B shows how request 350 may be routed to handle primary switchboard 305 being inoperative.

In FIG. 3B, initiator 145 may not send request 350 to device 120-1 via primary switchboard 305, because primary switchboard 305 is inoperative for some reason. (Another possibility might be where one or more of the pins on the connector on device 120-1 that supports the data plane has failed, but the pins on the connector supporting the control plane are still operative and the data on device 120-1 is still accessible.) Instead, initiator 145 sends request 350 to TOR switch 140 with instructions to route request 350 to management controller 345 on secondary switchboard 310. Because the Ethernet connection to device 120-1 is wired to primary switchboard 305, secondary switchboard 310 may not communicate with device 120-1 via Ethernet. But via midplane 315, management controller 345 may communicate with device 120-1 after a failure on primary switchboard 305 is detected. BMC 345 on secondary switchboard 310 may instruct initiator 145 to reroute the request via secondary switchboard 310. Therefore, TOR switch 140 may route request 350 to management controller 345 via path 375.

Management controller 345 may send a command to device 120-1 via PCIe lanes, the System Management Bus (SMBus), or any other communication path that might be available and using any desired interface: this communication path is shown as communication path 380. Management controller 345 may use any desired protocol: for example, a Non-Volatile Memory Express (NVMe) protocol or an NVME Management Interface protocol may be used.

While FIGS. 3A-3B show chassis 105 of FIG. 1 as including two half width switchboards 305 and 310, embodiments of the inventive concept may support any desired mechanisms to communicate with devices 120. For example, two full width switchboards could be used if it is possible to connect them both to midplane 315. In theory, switchboards 305 and 310 do not need to be inside chassis 105 of FIG. 1, provided that there are communication paths to devices 120.

Embodiments of the inventive concept provide advantages over traditional chassis and single port devices, in that device access is still possible even when primary switchboard 305 is not operative. Device 120 may offer some of the benefits of dual port technology without the cost of true dual port technology.

Embodiments of the inventive concept may extend to any hardware configuration that separates the data and control planes of the device. Effectively, in FIG. 3B, the control plane of secondary switchboard 310 is being used as a backup data plane for communicating with device 120-1 when primary switchboard 305 becomes inoperative.

Figure 4:
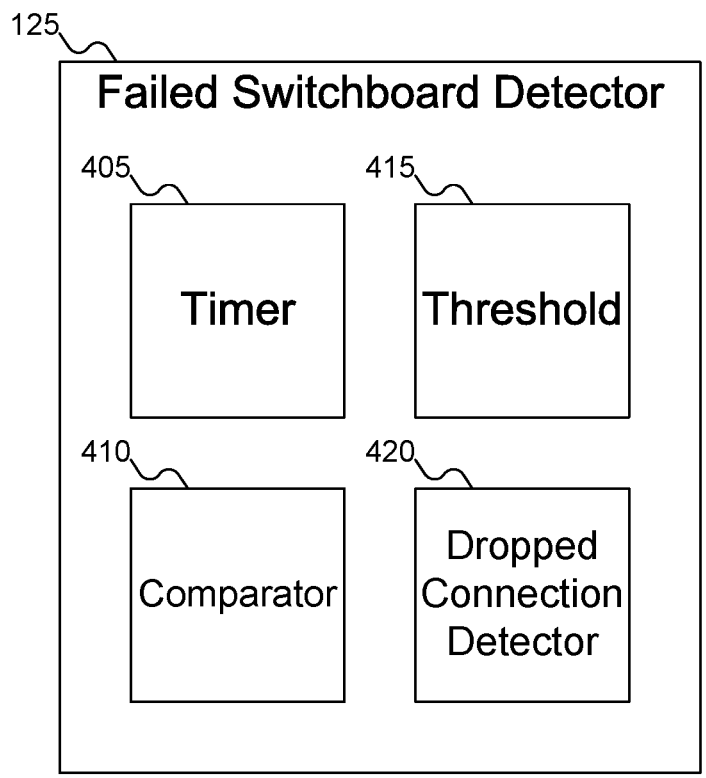
FIG. 4 shows details of the failed switchboard detector of FIG. 1.

FIG. 4 shows details of failed switchboard detector 125 of FIG. 1. In FIG. 4, failed switchboard detector 125 may include timer 405, comparator 410, and threshold 415. Timer 405 may measure the time taken by primary switchboard 305 of FIG. 3A to respond to request 350 of FIG. 3A. Comparator 410 may compare the time measured by timer 405 with threshold 415: if the time measured by timer 405 is greater than threshold 415, then failed switchboard detector 125 may conclude that primary switchboard 305 of FIG. 3 is inoperative, and initiator 145 of FIG. 1 may send request 350 of FIG. 3 to secondary switchboard 310 of FIG. 3A.

Alternatively, failed switchboard detector 125 may include dropped connection detector 420. Dropped connection detector 420 may detect when the connection with primary switchboard 305 of FIG. 3A has been lost (for example, if a signal on a slot-specific present pin is not detected). Dropped connection detector 420 may operate in any desired manner to determine that the connection with primary switchboard 305 of FIG. 3A has been lost.

Figure 5:
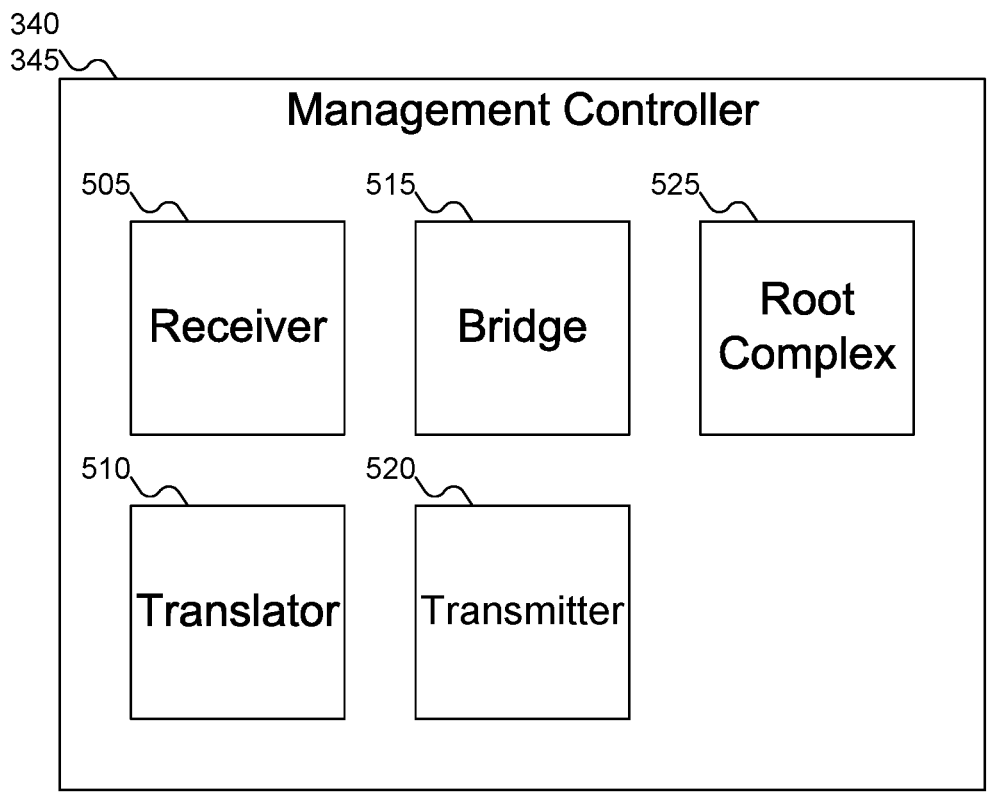
FIG. 5 shows details of the management controller of FIGS. 3A-3B.

FIG. 5 shows details of management controllers 340 and 345 of FIGS. 3A-3B. In FIG. 5, management controllers 340 and 345 may include receiver 505, translator 510, bridge 515, transmitter 520, and Root Complex 525. Receiver 505 may receive request 350 of FIG. 3A from initiator 145 of FIG. 1. Translator 510 may translate request 350 of FIG. 3A into a command that may be sent via a second communication path to device 120 of FIG. 1. For example, request 350 of FIG. 3A might be designed to use Ethernet switch 320 of FIG. 3A, but the second communication path (using secondary switchboard 310 of FIG. 3B) might need the request to be transmittable over PCIe lanes. Translator 510 may compensate for the possibility that request 350 of FIG. 3A might be in the wrong format for the second communication path to be used.

Bridge 515 enables management controllers 340 and 345 to act as bridge devices. That is, bridge 515 permits management controllers 340 and 345 to act as go-betweens for initiator 145 of FIG. 1 and device 120 of FIG. 1, "bridging" the connection between those devices. Transmitter 520 enables management controllers 340 and 345 to send information from management controllers 340 and 345. For example, when used in the second communication path, transmitter 520 may transmit commands to device 120 of FIG. 1 or response 370 of FIG. 3B to initiator 145.

Root Complex 525 is a component that enables management controllers 340 and 345 to act as a PCIe host. PCIe devices are typically categorized as either host or target: hosts initiate communications, whereas targets only receive and respond to communications from PCIe hosts. Root Complex 525 permits management controllers 340 and 345 to initiate communications along PCIe lanes, which is useful when management controllers 340 and 345 are acting in their bridge capacity as a second communication path. Note that management controllers 340 and 345 normally act only as PCIe targets: it is their use as a bridge that entails inclusion of Root Complex 525.

Figure 6:
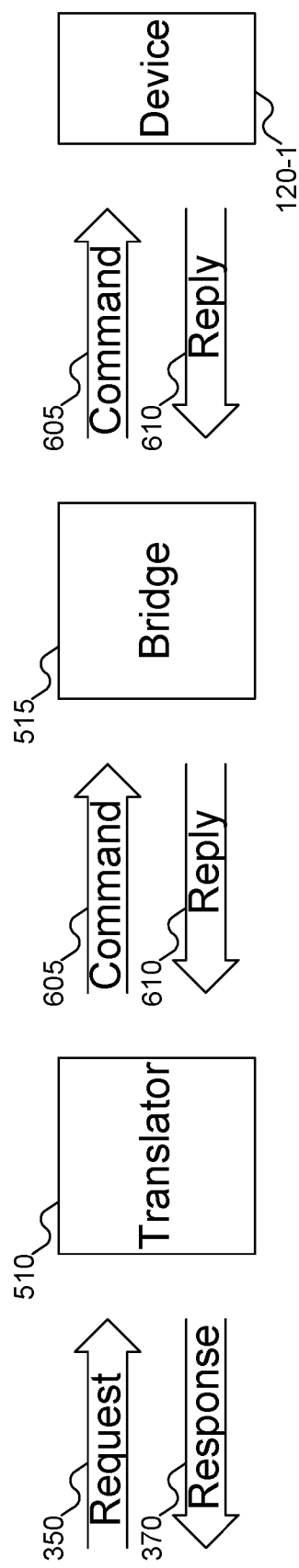
FIG. 6 shows the translator and bridge of FIG. 5 handling communications between the initiator and device of FIG. 1.

FIG. 6 shows translator 510 and bridge 515 of FIG. 5 handling communications between initiator 145 and device 120 of FIG. 1. In FIG. 6, translator 510 may receive request 350 and translate it into command 605 in a different format or protocol. Command 605 may then be sent via bridge 515 (and transmitter 520 of FIG. 5) to device 120-1. Device 120-1 may then return reply 610, which translator 510 may translate into response 370 in a different format or protocol, which may be returned to initiator 145 of FIG. 1.

Figure 7:
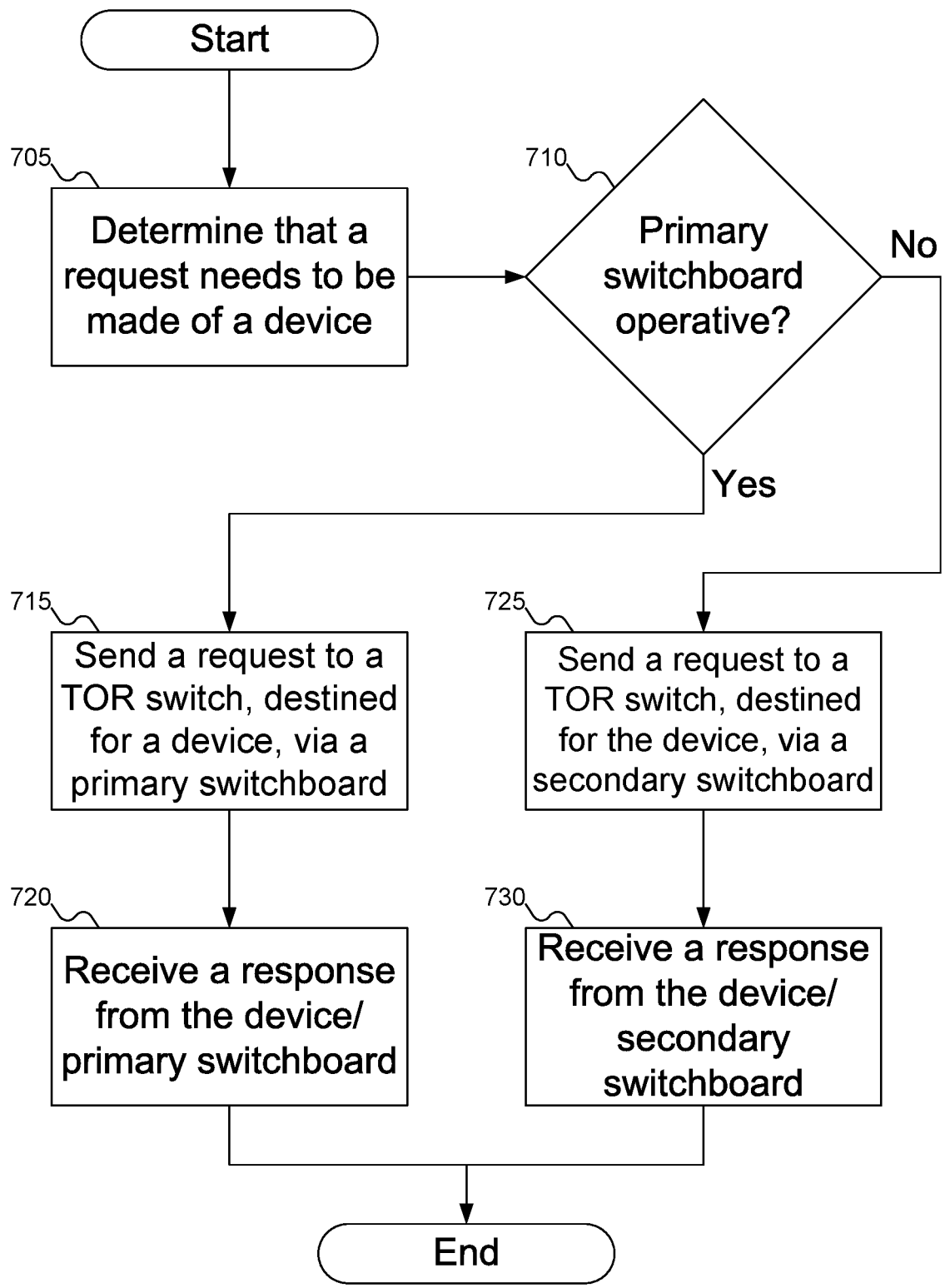
FIG. 7 shows a flowchart of an example procedure for the initiator of FIG. 1 to request that communication with the device of FIG. 1 be routed using a second communication path, according to an embodiment of the inventive concept.

FIG. 7 shows a flowchart of an example procedure for initiator 145 of FIG. 1 to request that communication with device 120 of FIG. 1 be routed using a second communication path, according to an embodiment of the inventive concept. In FIG. 7, at block 705, initiator 145 of FIG. 1 may determine that it needs to send request 350 of FIG. 3 to device 120 of FIG. 1. At block 710, failed switchboard detector 125 of FIG. 1 may determine if primary switchboard 305 of FIG. 3A is operative or not. If primary switchboard 305 of FIG. 3A is operative, then at block 715, initiator 145 of FIG. 1 may send request 350 of FIG. 3A to TOR switch 140, with request 350 of FIG. 3A destined for device 120-1 of FIG. 3A via primary switchboard 305 of FIG. 3A, and at block 720 initiator 145 of FIG. 1 may receive response 370 of FIG. 3A from device 120-1 of FIG. 3A and primary switchboard 305 of FIG. 3A.

Alternatively, if at block 710 failed switchboard detector 125 of FIG. 1 determines that primary switchboard 305 of FIG. 3A is not operative, then at block 725, initiator 145 of FIG. 1 may send request 350 of FIG. 3B to TOR switch 140, with request 350 of FIG. 3B destined for device 120-1 of FIG. 3B via secondary switchboard 310 of FIG. 3B, and at block 730 initiator 145 of FIG. 1 may receive response 370 of FIG. 3B from device 120-1 of FIG. 3A and secondary switchboard 310 of FIG. 3B.

In another embodiment of the inventive concept, management controller 345 of FIGS. 3A-3B may notify initiator 145 of FIG. 1 that primary switchboard 305 of FIG. 3A is not operating correctly (based, for example, on the "heartbeat" between management controllers 340 and 345 of FIG. 3A), and that initiator 145 of FIG. 1 should failover to secondary switchboard 310 of FIG. 3B. If management controller 345 of FIGS. 3A-3B has notified initiator 145 of FIG. 1 that primary switchboard 305 of FIG. 3A is not operating correctly, then at block 710 initiator 145 of FIG. 1 may determine that primary switchboard 305 of FIG. 3A is not operating correctly based on this communication. In that case, processing may proceed according to blocks 725 and 730, as described above, without involving failed switchboard detector 125 of FIG. 1.

Figure 8:
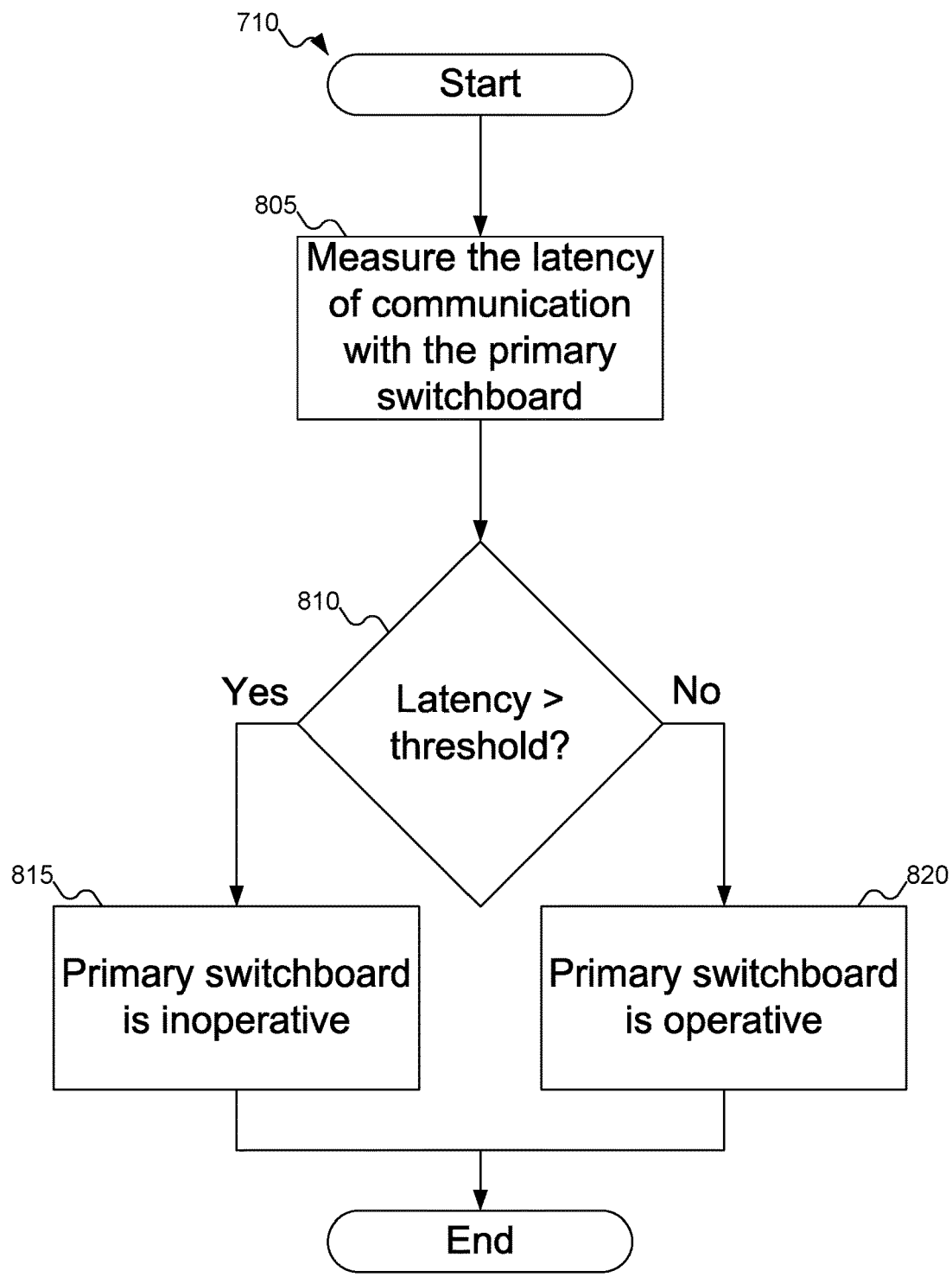
FIGS. 8-9 show flowcharts of example procedures for the failed switchboard detector of FIG. 1 to determine that the primary switchboard is inoperative, according to an embodiment of the inventive concept.
Figure 9:
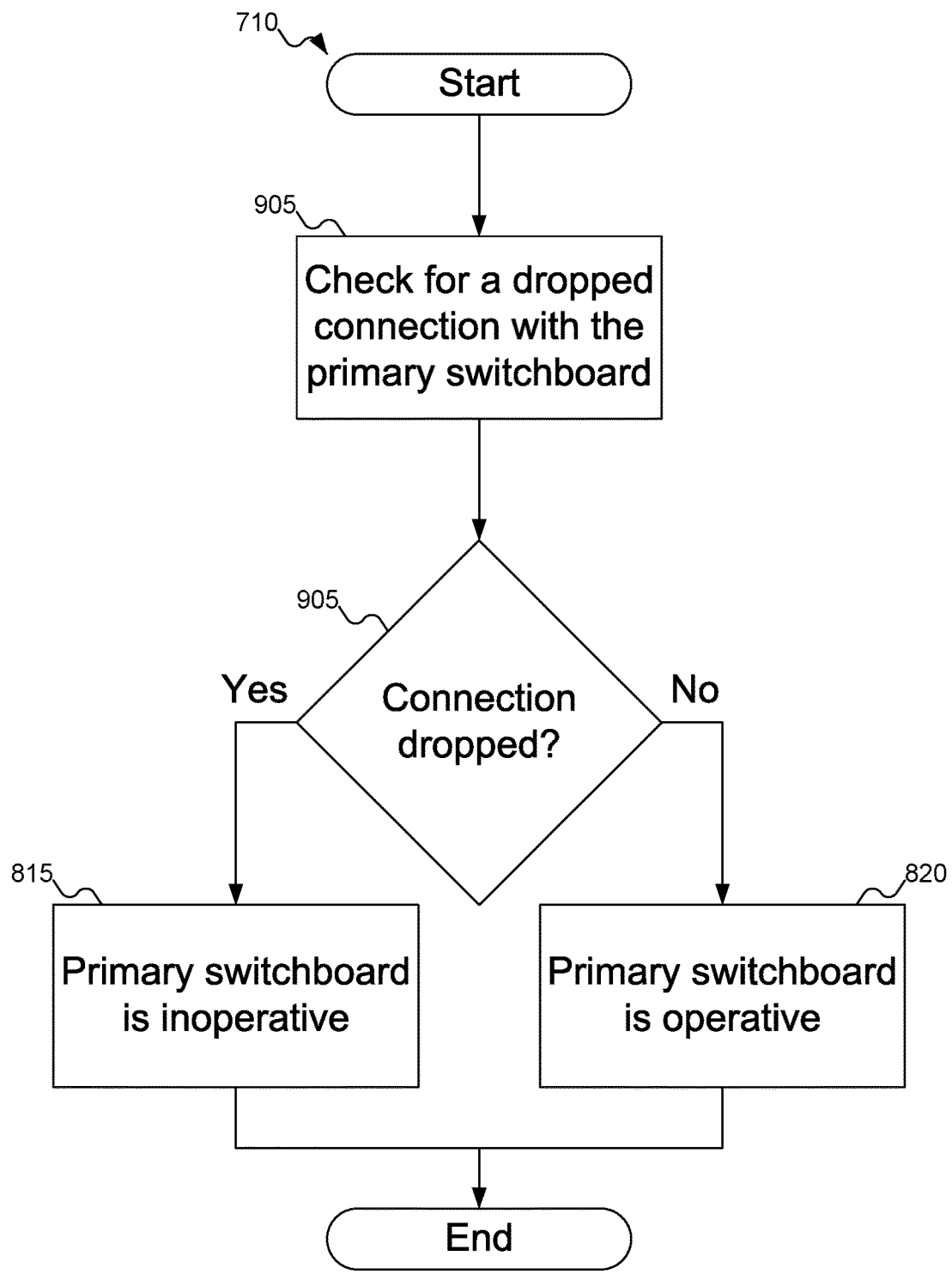

FIGS. 8-9 show flowcharts of example procedures for failed switchboard detector 125 of FIG. 1 to determine that the primary switchboard is inoperative, according to an embodiment of the inventive concept. In FIG. 8, at block 805, timer 405 of FIG. 4 may measure the latency of communication with primary switchboard 305 of FIG. 3A. At block 810, comparator 410 of FIG. 4 may compare the measured latency with threshold 415 of FIG. 4. If the measured latency is greater than threshold 415 of FIG. 4, then at block 815 failed switchboard detector 125 of FIG. 1 may report that primary switchboard 305 of FIG. 3A is inoperative; otherwise, at block 820 failed switchboard detector 125 of FIG. 1 may report that primary switchboard 305 of FIG. 3A is operative.

In comparison, in FIG. 9, dropped connection detector 420 of FIG. 4 may check to see if the connection with primary switchboard 305 of FIG. 3A is still active, and at block 905, dropped connection detector 420 of FIG. 4 may decide, based on its check, whether primary switchboard 305 of FIG. 3A is still active. If the primary switchboard 305 of FIG. 3A is not active, then at block 815 failed switchboard detector 125 of FIG. 1 may report that primary switchboard 305 of FIG. 3A is inoperative; otherwise, at block 820 failed switchboard detector 125 of FIG. 1 may report that primary switchboard 305 of FIG. 3A is operative.

Figure 10:
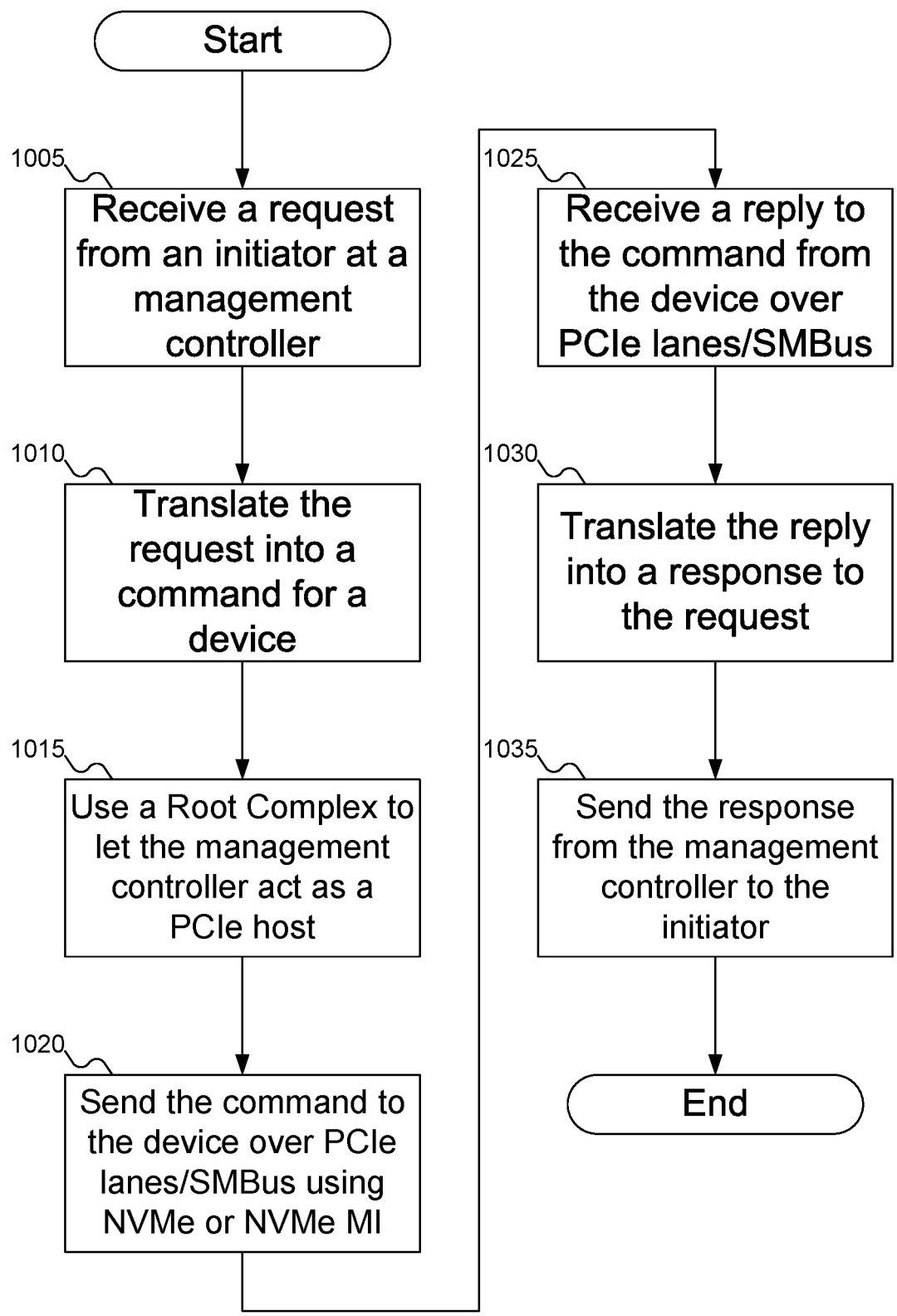
FIG. 10 shows a flowchart of an example procedure for the management controller of FIG. 1 to communicate with the device of FIG. 1 on behalf of the initiator of FIG. 1, according to an embodiment of the inventive concept.

Whereas FIGS. 7-9 show operations from the perspective of initiator 145 of FIG. 1, management controller 345 of FIG. 3B has its own operations. FIG. 10 shows a flowchart of an example procedure for management controller 345 of FIG. 3B to communicate with device 120-1 of FIG. 3B on behalf of initiator 145 of FIG. 1, according to an embodiment of the inventive concept. In FIG. 10, at block 1005, receiver 505 of FIG. 5 may receive (via TOR switch 140 of FIG. 1) request 350 of FIG. 3B from initiator 145 of FIG. 1. At block 1010, translator 510 of FIG. 5 may translate request 350 of FIG. 3B into command 605 of FIG. 6. Translator 510 of FIG. 5 may factor in the protocols used by device 120-1 of FIG. 3B and communication path 380 of FIG. 3B to be used in communicating with device 120-1 of FIG. 3B. At block 1015, management controller 345 of FIG. 3B may use Root Complex 525 of FIG. 5 to act as a host to initiate communications over communication path 380 of FIG. 3B. At block 1020, transmitter 520 of FIG. 5, using bridge 515 of FIG. 5, may transmit command 605 of FIG. 6 to device 120-1 of FIG. 3B.

At block 1025, receiver 505 of FIG. 5 may receive reply 610 of FIG. 6 from device 120-1 of FIG. 3B (via communication path 380 of FIG. 3B). At block 1030, translator 510 of FIG. 5 may translate reply 610 of FIG. 6 into response 370 of FIG. 3B. At block 1035, transmitter 520 of FIG. 5 may transmit response 370 of FIG. 3B back to initiator 145 of FIG. 1.

In FIGS. 7-10, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes an apparatus, comprising:
  a processor;
  software capable of running on the processor;
  a failed switchboard detector to determine whether a primary switchboard is operative;
  a transmitter to transmit a request to one of the primary switchboard via a first communication path and a secondary switchboard via a second communication path, responsive to the failed switchboard detector; and
  a receiver to receive a response to the request.

Statement 2. An embodiment of the inventive concept includes an apparatus according to statement 1, wherein the request is destined for a multi-mode single port device.

Statement 3. An embodiment of the inventive concept includes an apparatus according to statement 2, wherein the multi-mode single port device supports a Non-Volatile Memory Express over Fabrics (NVMeoF) protocol.

Statement 4. An embodiment of the inventive concept includes an apparatus according to statement 1, wherein the transmitter is operative to transmit the request to the primary switchboard via the first communication path if the primary switchboard is operative and to the secondary switchboard via the second communication path if the primary switchboard is inoperative.

Statement 5. An embodiment of the inventive concept includes an apparatus according to statement 4, wherein the transmitter is operative to transmit the request to a management controller on the secondary switchboard via the second communication path if the primary switchboard is inoperative, the second communication path including a Top of Rack (TOR) switch.

Statement 6. An embodiment of the inventive concept includes an apparatus according to statement 4, wherein:
the failed switchboard detector includes a timer to measure a latency of the primary switchboard; and
a comparator to compare the latency of the primary switchboard with a threshold to determine if the primary switchboard has failed.

Statement 7. An embodiment of the inventive concept includes an apparatus according to statement 4, wherein the failed switchboard detector includes a dropped connection detector to detect a dropped connection with the primary switchboard.

Statement 8. An embodiment of the inventive concept includes an apparatus according to statement 4, wherein the first communication path includes an Ethernet Port.

Statement 9. An embodiment of the inventive concept includes an apparatus according to statement 8, wherein the second communication path includes at least one Peripheral Component Interchange Express (PCIe) lane.

Statement 10. An embodiment of the inventive concept includes an apparatus according to statement 8, wherein the second communication path includes a System Management Bus (SMBus).

Statement 11. An embodiment of the inventive concept includes a management controller, comprising:
a receiver to receive a request from an initiator;
a translator to translate the request received from the initiator into a command for a multi-mode single port device and to translate a reply to the command into a response for the initiator;
a bridge to communicate with the multi-mode single port device, the bridge operative to send the command to the multi-mode single port device and to receive the reply from the multi-mode single port device; and
a transmitter to transmit the response to the initiator.

Statement 12. An embodiment of the inventive concept includes a management controller according to statement 11, wherein the management controller is a Baseboard Management controller (BMC).

Statement 13. An embodiment of the inventive concept includes a management controller according to statement 11, wherein the bridge is operative to communicate with the multi-mode single port device via at least one Peripheral Component Interconnect Express (PCIe) lane coupled to the multi-mode single port device.

Statement 14. An embodiment of the inventive concept includes a management controller according to statement 13, further comprising a Root Complex enabling the management controller to act as a PCIe host.

Statement 15. An embodiment of the inventive concept includes a management controller according to statement 11, wherein the bridge is operative to communicate with the multi-mode single port device via a System Management Bus (SMBus).

Statement 16. An embodiment of the inventive concept includes a management controller according to statement 11, wherein the bridge is operative to use a protocol drawn from a set including a Non-Volatile Memory Express (NVMe) protocol and an NVMe Management Interface.

Statement 17. An embodiment of the inventive concept includes a management controller according to statement 16, wherein the multi-mode single port device supports an NVMe over Fabrics (NVMeoF) protocol.

Statement 18. An embodiment of the inventive concept includes a method, comprising:
sending a first request to a multi-mode single port device via a primary switchboard over a first communication path, the multi-mode single port device supporting two communication paths to a host;
receiving a first response to the first request from the primary switchboard over the first communication path;
determining that a primary switchboard is not available after receiving the first response;
sending a second request destined for the multi-mode single port device to a management controller on a secondary switchboard over a second communication path; and
receiving a second response to the second request from the management controller on the secondary switchboard over the second communication path.

Statement 19. An embodiment of the inventive concept includes a method according to statement 18, further comprising:
determining that the primary switchboard is available after receiving the second response; and
sending a third request to the multi-mode single port device via the primary switchboard over the first communication path; and
receiving a third response to the third request from the primary switchboard over the first communication path.

Statement 20. An embodiment of the inventive concept includes a method according to statement 18, wherein determining that a primary switchboard is not available includes:
measuring a latency of communication with the primary switchboard; and
if the latency exceeds a threshold, deciding that the primary switchboard is not available.

Statement 21. An embodiment of the inventive concept includes a method according to statement 18, wherein determining that a primary switchboard is not available includes detecting a dropped connection with the primary switchboard.

Statement 22. An embodiment of the inventive concept includes a method according to statement 18, wherein the multi-mode single port device supports a Non-Volatile Memory Express over Fabrics (NVMeoF) protocol.

Statement 23. An embodiment of the inventive concept includes a method according to statement 18, wherein the first communication path includes an Ethernet Port.

Statement 24. An embodiment of the inventive concept includes a method according to statement 23, wherein the second communication path includes at least one Peripheral Component Interchange Express (PCIe) lane.

Statement 25. An embodiment of the inventive concept includes a method according to statement 23, wherein the second communication path includes a System Management Bus (SMBus).

Statement 26. An embodiment of the inventive concept includes a method, comprising:
receiving a request from an initiator at a management controller, the management controller included with a secondary switchboard;
translating the request into a command for a multi-mode single port device, the multi-mode single port device normally controlled from a primary switchboard;
sending the command from the management controller to the multi-mode single port device;
receiving a reply to the command from the multi-mode single port device at the management controller;
translating the reply into a response for the initiator; and
sending the response from the management controller to the initiator.

Statement 27. An embodiment of the inventive concept includes a method according to statement 26, wherein:
sending the command to the multi-mode single port device from the management controller includes sending the command to the multi-mode single port device from the management controller over at least one Peripheral Component Interconnect Express (PCIe) lane; and
receiving a reply to the command from the multi-mode single port device at the management controller includes receiving the reply to the command from the multi-mode single port device at the management controller over the at least one PCIe lane.

Statement 28. An embodiment of the inventive concept includes a method according to statement 27, wherein sending the command to the multi-mode single port device from the management controller over at least one Peripheral Component Interconnect Express (PCIe) lane includes using a Root Complex to enable the management controller to act as a PCIe host.

Statement 29. An embodiment of the inventive concept includes a method according to statement 26, wherein:
sending the command to the multi-mode single port device from the management controller includes sending the command to the multi-mode single port device from the management controller over a System Management Bus (SMBus); and
receiving a reply to the command from the multi-mode single port device at the management controller includes receiving the reply to the command from the multi-mode single port device at the management controller over the SMBus.

Statement 30. An embodiment of the inventive concept includes a method according to statement 26, wherein sending the command to the multi-mode single port device from the management controller includes sending the command to the multi-mode single port device from the management controller using a protocol drawn from asset including a Non-Volatile Memory Express (NVMe) protocol and an NVMe Management Interface.

Statement 31. An embodiment of the inventive concept includes a method according to statement 26, wherein:
translating the request into a command for a multi-mode single port device includes translating the request into an NVMe over Fabrics (NVMeoF) command; and
translating the reply into a response for the initiator includes translating a NVMeoF reply into the response.

Statement 32. An embodiment of the inventive concept includes an embodiment of the inventive concept includes an article, comprising a tangible storage medium, the tangible storage medium having stored thereon non-transitory instructions that, when executed by a machine, result in:
sending a first request to a multi-mode single port device via a primary switchboard over a first communication path, the multi-mode single port device supporting two communication paths to a host;
receiving a first response to the first request from the primary switchboard over the first communication path;
determining that a primary switchboard is not available after receiving the first response;
sending a second request destined for the multi-mode single port device to a management controller on a secondary switchboard over a second communication path; and
receiving a second response to the first second from the management controller on the secondary switchboard over the second communication path.

Statement 33. An embodiment of the inventive concept includes an article according to statement 32, the tangible storage medium having stored thereon further non-transitory instructions that, when executed by the machine, result in:
determining that the primary switchboard is available after receiving the second response; and
sending a third request to the multi-mode single port device via the primary switchboard over the first communication path; and
receiving a third response to the third request from the primary switchboard over the first communication path.

Statement 34. An embodiment of the inventive concept includes an article according to statement 32, wherein determining that a primary switchboard is not available includes:
measuring a latency of communication with the primary switchboard; and
if the latency exceeds a threshold, deciding that the primary switchboard is not available.

Statement 35. An embodiment of the inventive concept includes an article according to statement 32, wherein determining that a primary switchboard is not available includes detecting a dropped connection with the primary switchboard.

Statement 36. An embodiment of the inventive concept includes an article according to statement 32, wherein the multi-mode single port device supports a Non-Volatile Memory Express over Fabrics (NVMeoF) protocol.

Statement 37. An embodiment of the inventive concept includes an article according to statement 32, wherein the first communication path includes an Ethernet Port.

Statement 38. An embodiment of the inventive concept includes an article according to statement 37, wherein the second communication path includes at least one Peripheral Component Interchange Express (PCIe) lane.

Statement 39. An embodiment of the inventive concept includes an article according to statement 37, wherein the second communication path includes a System Management Bus (SMBus).

Statement 40. An embodiment of the inventive concept includes an embodiment of the inventive concept includes an article, comprising a tangible storage medium, the tangible storage medium having stored thereon non-transitory instructions that, when executed by a machine, result in:
receiving a request from an initiator at a management controller, the management controller included with a secondary switchboard;
translating the request into a command for a multi-mode single port device, the multi-mode single port device normally controlled from a primary switchboard;
sending the command from the management controller to the multi-mode single port device;
receiving a reply to the command from the multi-mode single port device at the management controller;
translating the reply into a response for the initiator; and
sending the response from the management controller to the initiator.

Statement 41. An embodiment of the inventive concept includes an article according to statement 40, wherein:
sending the command to the multi-mode single port device from the management controller includes sending the command to the multi-mode single port device from the management controller over at least one Peripheral Component Interconnect Express (PCIe) lane; and
receiving a reply to the command from the multi-mode single port device at the management controller includes receiving the reply to the command from the multi-mode single port device at the management controller over the at least one PCIe lane.

Statement 42. An embodiment of the inventive concept includes an article according to statement 41, wherein sending the command to the multi-mode single port device from the management controller over at least one Peripheral Component Interconnect Express (PCIe) lane includes using a Root Complex to enable the management controller to act as a PCIe host.

Statement 43. An embodiment of the inventive concept includes an article according to statement 40, wherein:
sending the command to the multi-mode single port device from the management controller includes sending the command to the multi-mode single port device from the management controller over a System Management Bus (SMBus); and
receiving a reply to the command from the multi-mode single port device at the management controller includes receiving the reply to the command from the multi-mode single port device at the management controller over the SMBus.

Statement 44. An embodiment of the inventive concept includes an article according to statement 40, wherein sending the command to the multi-mode single port device from the management controller includes sending the command to the multi-mode single port device from the management controller using a protocol drawn from asset including a Non-Volatile Memory Express (NVMe) protocol and an NVMe Management Interface.

Statement 45. An embodiment of the inventive concept includes an article according to statement 40, wherein:
translating the request into a command for a multi-mode single port device includes translating the request into an NVMe over Fabrics (NVMeoF) command; and
translating the reply into a response for the initiator includes translating a NVMeoF reply into the response.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A management controller, comprising:
a receiver to receive a request from an initiator;
a translator to translate the request received from the initiator into a command for a multi-mode single port device and to translate a reply to the command into a response for the initiator;
a bridge to communicate with the multi-mode single port device, the bridge operative to send the command to the multi-mode single port device and to receive the reply from the multi-mode single port device; and
a transmitter to transmit the response to the initiator,
wherein the management controller provides a backup data communication path along a control plane between the initiator and the multi-mode single port device when communication with the multi-mode single port device along a primary data communication is interrupted,
wherein the management controller is included on a switchboard including an Ethernet switch and a Peripheral Component Interconnect Express (PCIe) switch, but the Ethernet switch and the PCIe switch are not directly connected to the multi-mode single port device, and
wherein the multi-mode single port device may receive the request using a first protocol or a second protocol over a connector on the multi-mode single port device.

2. A management controller according to claim 1, wherein the management controller is a Baseboard Management controller (BMC).

3. A management controller according to claim 1, wherein the bridge is operative to communicate with the multi-mode single port device via at least one Peripheral Component Interconnect Express (PCIe) lane coupled to the multi-mode single port device.

4. A management controller according to claim 3, further comprising a Root Complex enabling the management controller to act as a PCIe host.

5. A management controller according to claim 1, wherein the bridge is operative to communicate with the multi-mode single port device via a System Management Bus (SMBus).

6. A management controller according to claim 1, wherein the bridge is operative to use the first protocol drawn from a set including a Non-Volatile Memory Express (NVMe) protocol and an NVMe Management Interface.

7. A method, comprising:
sending a first request to a multi-mode single port device via a primary switchboard over a first communication path, the multi-mode single port device supporting two communication paths to a host;
receiving a first response to the first request from the primary switchboard over the first communication path;
determining that a primary switchboard is not available after receiving the first response;
sending a second request destined for the multi-mode single port device to a management controller on a secondary switchboard over a second communication path;
receiving a second response to the second request from the management controller on the secondary switchboard over the second communication path,
determining that the primary switchboard is available after receiving the second response; and
sending a third request to the multi-mode single port device via the primary switchboard over the first communication path; and
receiving a third response to the third request from the primary switchboard over the first communication path,
wherein the secondary switchboard includes an Ethernet switch and a Peripheral Component Interconnect Express (PCIe) switch, but the Ethernet switch and the PCIe switch are not directly connected to the multi-mode single port device, and
wherein the multi-mode single port device may receive the request using a first protocol or a second protocol over a connector on the multi-mode single port device.

8. A method according to claim 7, wherein determining that a primary switchboard is not available includes:
measuring a latency of communication with the primary switchboard; and
if the latency exceeds a threshold, deciding that the primary switchboard is not available.

9. A method according to claim 7, wherein determining that a primary switchboard is not available includes detecting a dropped connection with the primary switchboard.

10. A method according to claim 7, wherein the multi-mode single port device supports a Non-Volatile Memory Express over Fabrics (NVMeoF) protocol.

11. A method according to claim 7, wherein the first communication path includes an Ethernet Port.

12. A method according to claim 11, wherein the second communication path includes at least one Peripheral Component Interchange Express (PCIe) lane.

13. A method according to claim 11, wherein the second communication path includes a System Management Bus (SMBus).

14. A method, comprising:
receiving a request from an initiator at a management controller, the management controller included with a secondary switchboard;
translating the request into a command for a multi-mode single port device, the multi-mode single port device normally controlled from a primary switchboard;
sending the command from the management controller to the multi-mode single port device;
receiving a reply to the command from the multi-mode single port device at the management controller;
translating the reply into a response for the initiator; and
sending the response from the management controller to the initiator,
wherein the management controller is along a backup communication path between the initiator and the multi-mode single port device that is used when communication along a primary communication path between the initiator and the multi-mode single port device is interrupted,
wherein the secondary switchboard includes an Ethernet switch and a Peripheral Component Interconnect Express (PCIe) switch, but the Ethernet switch and the PCIe switch are not directly connected to the multi-mode single port device, and
wherein the multi-mode single port device may receive the request using a first protocol or a second protocol over a connector on the multi-mode single port device.

15. A method according to claim 14, wherein:
sending the command to the multi-mode single port device from the management controller includes sending the command to the multi-mode single port device from the management controller over at least one Peripheral Component Interconnect Express (PCIe) lane; and
receiving a reply to the command from the multi-mode single port device at the management controller includes receiving the reply to the command from the multi-mode single port device at the management controller over the at least one PCIe lane.

16. A method according to claim 15, wherein sending the command to the multi-mode single port device from the management controller over at least one Peripheral Component Interconnect Express (PCIe) lane includes using a Root Complex to enable the management controller to act as a PCIe host.

17. A method according to claim 14, wherein:
sending the command to the multi-mode single port device from the management controller includes sending the command to the multi-mode single port device from the management controller over a System Management Bus (SMBus); and
receiving a reply to the command from the multi-mode single port device at the management controller includes receiving the reply to the command from the multi-mode single port device at the management controller over the SMBus.

18. A method according to claim 14, wherein sending the command to the multi-mode single port device from the management controller includes sending the command to the multi-mode single port device from the management controller using the first protocol drawn from asset including a Non-Volatile Memory Express (NVMe) protocol and an NVMe Management Interface.

19. A method according to claim 14, wherein:
translating the request into a command for a multi-mode single port device includes translating the request into an NVMe over Fabrics (NVMeoF) command; and
translating the reply into a response for the initiator includes translating a NVMeoF reply into the response.

* * * * *